United States Patent
Ji et al.

(10) Patent No.: US 9,203,584 B2
(45) Date of Patent: Dec. 1, 2015

(54) TDM-FDM RELAY BACKHAUL CHANNEL FOR LTE ADVANCED

(75) Inventors: Tingfang Ji, San Diego, CA (US); Aamod Dinkar Khandekar, San Diego, CA (US); Wanshi Chen, San Diego, CA (US); Juan Montojo, San Diego, CA (US); Alexei Yurievitch Gorokhov, San Diego, CA (US); Ravi Palanki, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 996 days.

(21) Appl. No.: 12/917,160

(22) Filed: Nov. 1, 2010

(65) Prior Publication Data
US 2011/0103296 A1    May 5, 2011

Related U.S. Application Data
(60) Provisional application No. 61/257,407, filed on Nov. 2, 2009.

(51) Int. Cl.
| | | |
|---|---|---|
| *H04B 7/14* | (2006.01) | |
| *H04L 5/00* | (2006.01) | |
| *H04B 7/155* | (2006.01) | |

(52) U.S. Cl.
CPC .......... *H04L 5/0053* (2013.01); *H04B 7/15528* (2013.01); *H04L 5/0007* (2013.01)

(58) Field of Classification Search
None
See application file for complete search history.

(56) References Cited

U.S. PATENT DOCUMENTS

| 8,174,995 | B2 | 5/2012 | Malladi | |
|---|---|---|---|---|
| 8,300,533 | B2 | 10/2012 | Malladi et al. | |
| 2011/0194524 | A1* | 8/2011 | Hedlund et al. | 370/329 |

(Continued)

FOREIGN PATENT DOCUMENTS

| JP | 2012517179 A | 7/2012 |
|---|---|---|
| JP | 2013502812 A | 1/2013 |
| WO | 2008024751 A2 | 2/2008 |

(Continued)

OTHER PUBLICATIONS

CATT: "Design of reference signals for relay backhaul link in LTE-A", R1-094152, 3rd Generation Partnership Project (3GPP), Mobile Competence Centre; 650, Route Des Lucioles; F-06921 Sophia-Antipolis Cedex; France, no. Miyazaki, Oct. 12, 2009, XP050388622, [retrieved on Oct. 6, 2009].

(Continued)

*Primary Examiner* — Jae Y Lee
*Assistant Examiner* — Tito Pham
(74) *Attorney, Agent, or Firm* — Anthony R. Morris

(57) ABSTRACT

Methods, apparatus and computer program products are provided for receiving a first group of resource blocks, frequency multiplexed in a transmission subframe, where the first group of resource blocks spans less than a full transmission bandwidth and includes a UE control channel in a first time interval, a relay control channel and a first quantity of dedicated reference symbols in a second time interval, and a shared data channel and a second quantity of dedicated reference symbols in a third time interval.

This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

26 Claims, 16 Drawing Sheets

(56) References Cited

U.S. PATENT DOCUMENTS

2012/0163319 A1* 6/2012 Roessel et al. ............... 370/329
2012/0213147 A1* 8/2012 Noh et al. .................... 370/315

FOREIGN PATENT DOCUMENTS

WO       2008045781      4/2008
WO    WO-2011021852 A2    2/2011

OTHER PUBLICATIONS

International Search Report and Written Opinion—PCT/US2010/055167, International Search Authority—European Patent Office—Jan. 31, 2011.

LG-Nortel: "Dynamic R-PDCCH for TDM+FDM configuration", 3GPP Draft; R1-101028 Dynamic R-PDCCH for TDM+FDM Configuration, 3rd Generation Partnership Project (3GPP), Mobile Competence Centre; 650, Route Des Lucioles; F-06921 Sophia-Antipolis Cedex; France. vol. RAN WG1, no. San Francisco, USA; Feb. 22, 2010, (Feb. 16, 2010), XP050418601.

Samsung: "DL backhaul physical channel design for Type I relay", 3GPP Draft; R1-093384 Relay DL Backhaul Design for Type I Relay, 3rd Generation Partnership Project (3GPP), Mobile Competence Centre; 650, Route Des Lucioles; F-06921 Sophia-Antipolis Cedex; France, no. Shenzhen, China; Aug. 19, 2009, XP050351681, [retrieved on Aug. 19, 2009].

ZTE: "Considerations on Demodulation Reference Signal in Backhaul Downlink", 3GPP Draft; R1-093204_BACKHAULDMRS, 3rd Generation Partnership. Project (3GPP), Mobile Competence Centre; 650, Route Des Lucioles; F-06921 Sophia-Antipolis Cedex; France, no. Shenzhen, China; Aug. 19, 2009, XP050351557.

Taiwan Search Report—TW099137662—TIPO—Jan. 20, 2014.

* cited by examiner

TDM-FDM RELAY BACKHAUL CHANNEL FOR LTE ADVANCED

The present application claims priority to U.S. Provisional Patent Application Ser. No. 61/257,407 entitled "Method and System for Establishing a TDM-FDM Relay Backhaul Channel," filed Nov. 2, 2009, the entirety of which is hereby incorporated by reference.

FIELD OF INVENTION

The present invention relates generally to the field of wireless communications and, in particular, to systems and methods for communication between a base station, a relay node and a user equipment.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Relaying is considered for LTE-Advanced as a tool to improve the coverage of high data rates, group mobility, temporary network deployment, cell-edge throughput and/or to provide coverage to new areas. In relaying, a base station (eNodeB), known as a donor cell, communicates indirectly with a mobile station (user equipment or UE) by way of a wireless connection with a relay node called a relay backhaul channel. The donor cell transmits data and control information for the user equipment over the relay backhaul channel to the relay node. The relay node should be capable of decoding the UE's data and control information and forwarding the data and control information to the UE in a form that the UE recognizes. That is, from the perspective of the UE, the relay node should look like just another base station. The relay node should also be capable of receiving its own data and control information from the donor cell over the backhaul channel without interfering with the UE's data and control information. However, no definitive protocol for a relay backhaul channel has been specified for LTE Advanced.

SUMMARY

The disclosed embodiments relate to systems, methods, apparatus and computer program products for implementing a relay backhaul channel in a wireless communication system.

According to one disclosed embodiment, a method in a relay node includes receiving a first plurality of resource blocks, frequency multiplexed in a transmission subframe, wherein the first plurality of resource blocks spans less than a full transmission bandwidth, and wherein the first plurality of resource blocks comprises a user equipment (UE) control channel in a first time interval, a relay control channel and a first plurality of dedicated reference symbols in a second time interval, and a shared data channel and a second plurality of dedicated reference symbols in a third time interval. The method further includes decoding relay control information from the relay control channel and decoding relay data and user data from the shared data channel.

In one embodiment, the second time interval further comprises a plurality of common reference symbols configured to decode the relay control information from the relay control channel. In one embodiment, the first plurality of dedicated reference symbols is configured to decode the relay data from the shared data channel, while in another embodiment, the second plurality of dedicated reference symbols is configured to decode the relay data from the shared data channel.

According to another embodiment, the first plurality of dedicated reference symbols and the second plurality of dedicated reference symbols are configured to support a multi-layer transmission mode. In one embodiment, the first plurality and second plurality of dedicated reference symbols are scrambled and power-controlled to match dedicated reference symbols in resource blocks without relay control channels.

In one embodiment, the first plurality of dedicated reference symbols is configured to decode the relay control information from the relay control channel and the second plurality of dedicated reference symbols is configured to decode the relay data from the shared data channel. In still another embodiment, the first plurality and the second plurality of dedicated reference symbols are configured to decode the relay control information from the relay control channel.

According to another embodiment, the first plurality and the second plurality of dedicated reference symbols are configured to decode the relay data from the shared data channel. In yet another embodiment, the first plurality of dedicated reference symbols is configured to decode the relay control information from the relay control channel in a first spatial layer, and the second plurality of dedicated reference symbols is configured to decode the relay data from the shared data channel in a second spatial layer. In one embodiment, the above-noted method further comprises forwarding UE control information and the user data to a user equipment.

In one embodiment, the method further includes receiving a second plurality of resource blocks in the transmission subframe, the second plurality of resource blocks comprising a shared data channel in the second and third time intervals, wherein a power level of selected resource elements in the second time interval is controlled to equalize a power spectral density across OFDM symbols in the second time interval and the third time interval of the second plurality of resource blocks.

In one aspect, the first plurality of resource blocks and the second plurality of resource blocks jointly span the full transmission bandwidth, and a power level of selected resource elements in the second time interval of the first plurality of resource blocks is controlled to equalize the power spectral density across OFDM symbols in the first time interval, the second time interval and the third time interval.

In one embodiment, a method in a base station includes transmitting a first plurality of resource blocks, frequency multiplexed in a transmission subframe, wherein the first plurality of resource blocks spans less than a full transmission bandwidth, and wherein the first plurality of resource blocks comprises a UE control channel in a first time interval, a relay control channel and a first plurality of dedicated reference symbols in a second time interval, and a shared data channel and a second plurality of dedicated reference symbols in a third time interval, wherein the relay control channel comprises relay control information and the shared data channel comprises relay data and user data.

In one embodiment, the method further includes transmitting a second plurality of resource blocks in the transmission subframe, the second plurality of resource blocks comprising a shared data channel in the second and third time intervals, wherein a power level of selected resource elements in the second time interval is controlled to equalize a power spectral density across OFDM symbols in the second time interval and the third time interval of the second plurality of resource blocks.

In one aspect, the first plurality of resource blocks and the second plurality of resource blocks jointly span the full transmission bandwidth, and a power level of selected resource elements in the second time interval of the first plurality of resource blocks is controlled to equalize the power spectral density across OFDM symbols in the first time interval, the second time interval and the third time interval.

Other disclosed embodiments include apparatus and computer program products for performing the disclosed methods. These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Provided embodiments are illustrated by way of example, and not of limitation, in the figures of the accompanying drawings in which.

DETAILED DESCRIPTION

Figure 1:
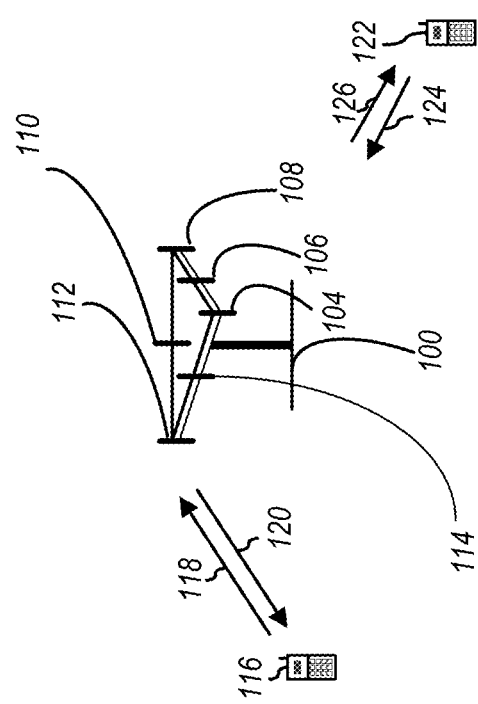
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, such as hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word "exemplary" is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_s \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

3G 3rd Generation
3GPP 3rd Generation Partnership Project
ACLR Adjacent channel leakage ratio
ACPR Adjacent channel power ratio
ACS Adjacent channel selectivity
ADS Advanced Design System
AMC Adaptive modulation and coding
A-MPR Additional maximum power reduction
ARQ Automatic repeat request
BCCH Broadcast control channel
BTS Base transceiver station
CCE Channel Control Element
CDD Cyclic delay diversity
CCDF Complementary cumulative distribution function
CDMA Code division multiple access
CFI Control format indicator
Co-MIMO Cooperative MIMO
CP Cyclic prefix
CPICH Common pilot channel
CPRI Common public radio interface
CQI Channel quality indicator
CRC Cyclic redundancy check
DCI Downlink control indicator
DFT Discrete Fourier transform
DFT-SOFDM Discrete Fourier transform spread OFDM
DL Downlink (base station to subscriber transmission)
DL-SCH Downlink shared channel
DSP Digital signal processing
DT Development toolset
DVSA Digital vector signal analysis
EDA Electronic design automation
E-DCH Enhanced dedicated channel
E-UTRAN Evolved UMTS terrestrial radio access network
eMBMS Evolved multimedia broadcast multicast service
eNB Evolved Node B
EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform
FRC Fixed reference channel
FS1 Frame structure type 1
FS2 Frame structure type 2
GSM Global system for mobile communication
HARQ Hybrid automatic repeat request
HDL Hardware description language
HI HARQ indicator
HSDPA High speed downlink packet access
HSPA High speed packet access
HSUPA High speed uplink packet access
IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MCS Modulation and Coding Scheme
MIMO Multiple input multiple output
MISO Multiple input single output
MME Mobility management entity
MOP Maximum output power
MPR Maximum power reduction
MU-MIMO Multiple user MIMO
NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel
PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUSCH Physical uplink shared channel
RB Resource Block
RBG Resource Block Group
RE Resource Element
REG Resource Element Group
RNTI Radio Network Temporary Identifier.

Figure 2:
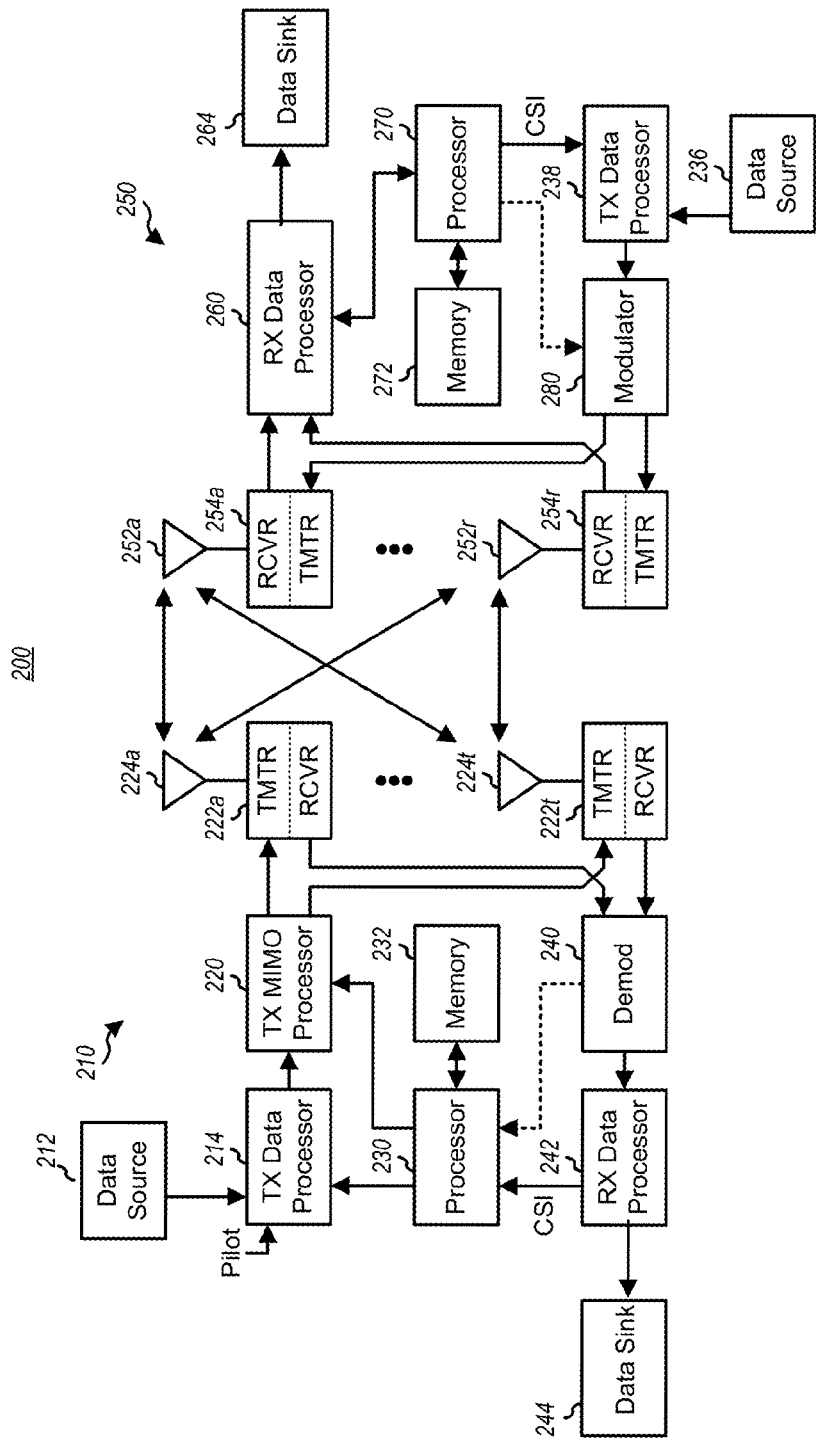
FIG. 2 illustrates a block diagram of a communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further process the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise ratio (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 may be processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 252r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

Figure 3:
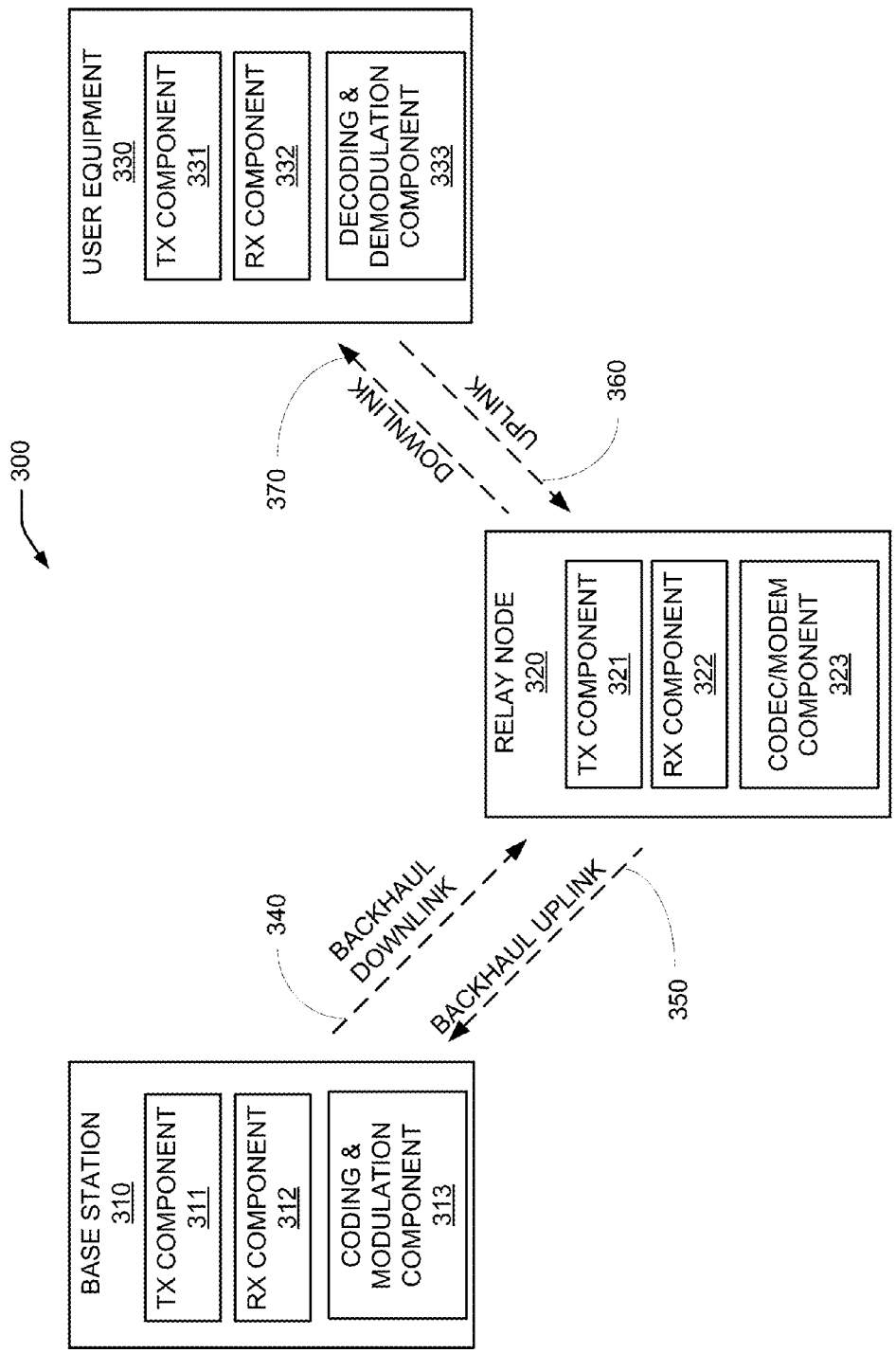
FIG. 3 is a block diagram of a system illustrating disclosed embodiments.

As noted above, LTE Advanced contemplates the use of relay nodes to serve as intermediaries between base stations (eNodeBs) and user equipment (UEs), principally for UEs at the edges of a cell where they could experience interference if served directly by the base station. FIG. 3 illustrates a system 300 in which various disclosed embodiments may be implemented. The system 300 includes a base station 310, a relay node 320 and a user equipment 330. The base station 310 communicates with the relay node 320 over a wireless backhaul downlink 340 and a wireless backhaul uplink 350. The relay node 320 communicates with the user equipment 330 over a wireless downlink 370 and a wireless uplink 360.

Base station 310 may include a transmitter (TX) component 311 to send data and control signals to the relay node over the wireless backhaul downlink 340, and a receiver (RX) component 312 to receive data and control signals from the relay node 320 over the wireless backhaul uplink 350. The base station 310 may also include a coding and modulation component 313 to generate the coding and modulation of the data and control signals transmitted to the relay node 320.

The relay node 320 may include a receiver component 322 to receive data and control signals from the base station over the wireless backhaul downlink 340 and from the user equipment 330 over the wireless uplink 360. The relay node 320 may also include a transmitter component 321 to transmit data and control signals to the base station over the wireless backhaul uplink 350 and to the user equipment 330 over the wireless downlink 370. The relay node 320 may also include a modulation/demodulation (modem) and encoding/decoding (codec) component 323 to demodulate/decode data and control signals received from the base station 310 and to modulate/encode data and control signals sent to the user equipment 330.

The user equipment 330 may include a receiver component 332 to receive user data and user control signals from the relay node 320 over the wireless downlink 370. User equipment 330 may also include a transmitter component 331 to transmit user data and user control signals to the relay node 320 over the wireless uplink channel 360. The user equipment 330 may also include a decoding and demodulation component 333 to decode and demodulate the data and control signals that it receives from the relay node 320 or the base station 310.

Figure 4:
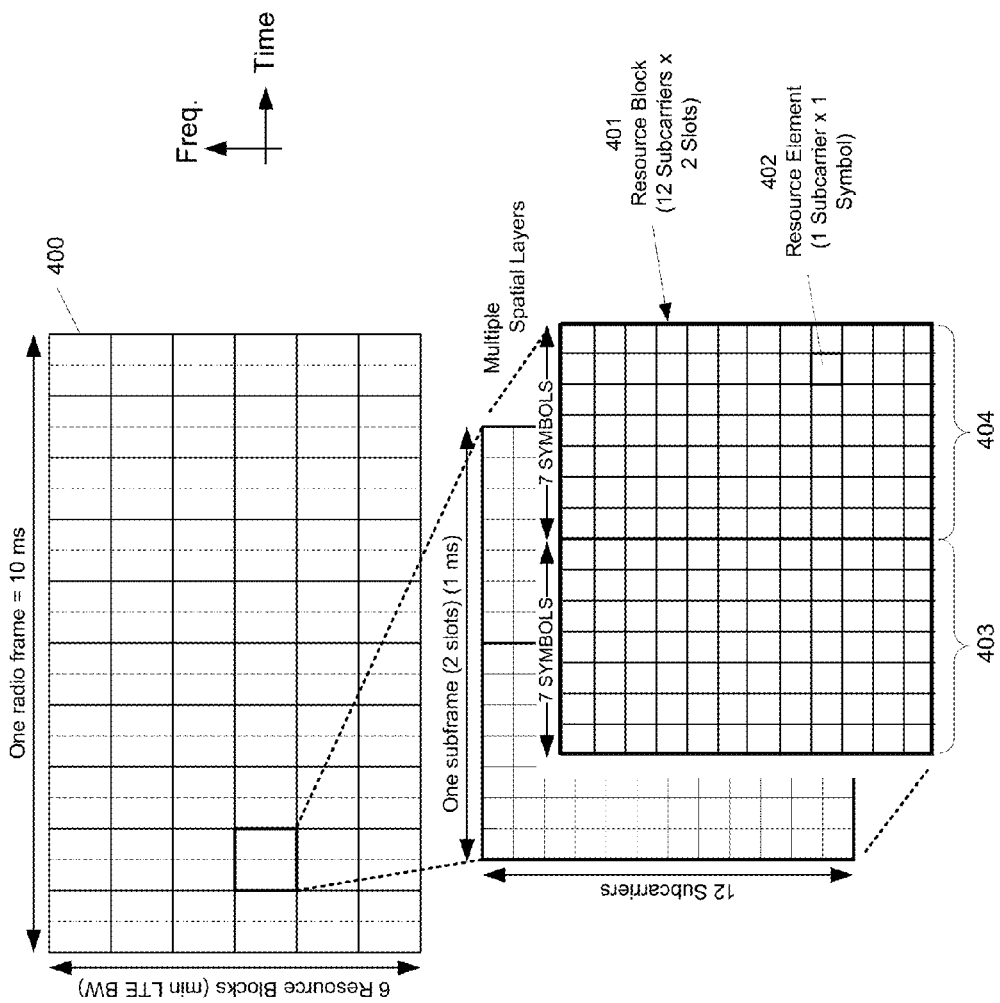
FIG. 4 illustrates time-frequency resource allocations.

The basic time-frequency resource in LTE Rel-8 is the resource block (RB), which spans one subframe (1 millisecond) in the time domain and 12 contiguous OFDM (orthogonal frequency division multiplex) subcarriers on the wireless downlink 370 at 15 KHz intervals. In one embodiment, the basic time-frequency resource on the wireless backhaul downlink is also the resource block, although it will be appreciated that other time-frequency resource units are contemplated within the scope of the disclosed embodiments. FIG. 4 illustrates the basic time-frequency design of LTE Rel-8. A radio frame 400 has a duration of 10 milliseconds (ms) and spans a number of resource blocks (RBs) 401 in the frequency domain and ten 1 ms subframes in the time domain. The total number of RBs used for any LTE transmission is proportional to the system bandwidth (BW). For example, a 5 MHz system bandwidth requires 25 RBs; while a 10 MHz system bandwidth requires 50 RBs (each transmission BW includes upper and lower guard bands). The minimum system bandwidth specified for LTE Rel-8 is 1.4 MHz (6 RBs) as illustrated in FIG. 4, and the maximum specified transmission bandwidth is 20 MHZ (110 RBs). Each resource block 401 is divided into two slots 403 and 404 and each slot spans 6 or 7 OFDM symbols on the wireless downlink 370, depending on the length of a cyclic prefix (CP). The CP length is selected based on the level of inter-symbol interference (ISI) due to multipath effects. When multipath interference is high, an extended CP serves to decorrelate the multipath signals, which improves signal quality. With a standard CP, there are 7 OFDM symbols per slot (as shown in FIG. 4). With an extended CP, there are 6 OFDM symbols per slot.

The smallest unit of resource is a resource element 402, which spans one subcarrier in the frequency domain and 1 symbol in the time domain. The number of bits per symbol is a function of the modulation scheme and can vary from 2 bits per symbol (QPSK modulation) to 6 bits per symbol (64 QAM). In LTE Rel-8, symbols used for control are always QPSK symbols, which have the highest immunity to interference of all the permitted modulation schemes in LTE Rel-8. In some transmission modes (LTE Rel-8 supports 7 different transmission modes), resources may be spatially multiplexed in two of more layers.

In a conventional LTE Rel-8 downlink resource block, transmitted from a base station to a user equipment, the first three OFDM symbols (symbols 1-3) are reserved for control signals such as the physical downlink control channel (PDCCH), the physical hybrid ARQ indicator channel (PHICH) and the physical control format indicator channel (PCFICH). The next four OFDM symbols (symbols 4-7) in the first time slot 403, and the next seven OFDM symbols (symbols 8-14) in the second time slot 404 are reserved for the physical downlink shared data channel (PDSCH), which comprises the data payload for the UE.

Figure 5:
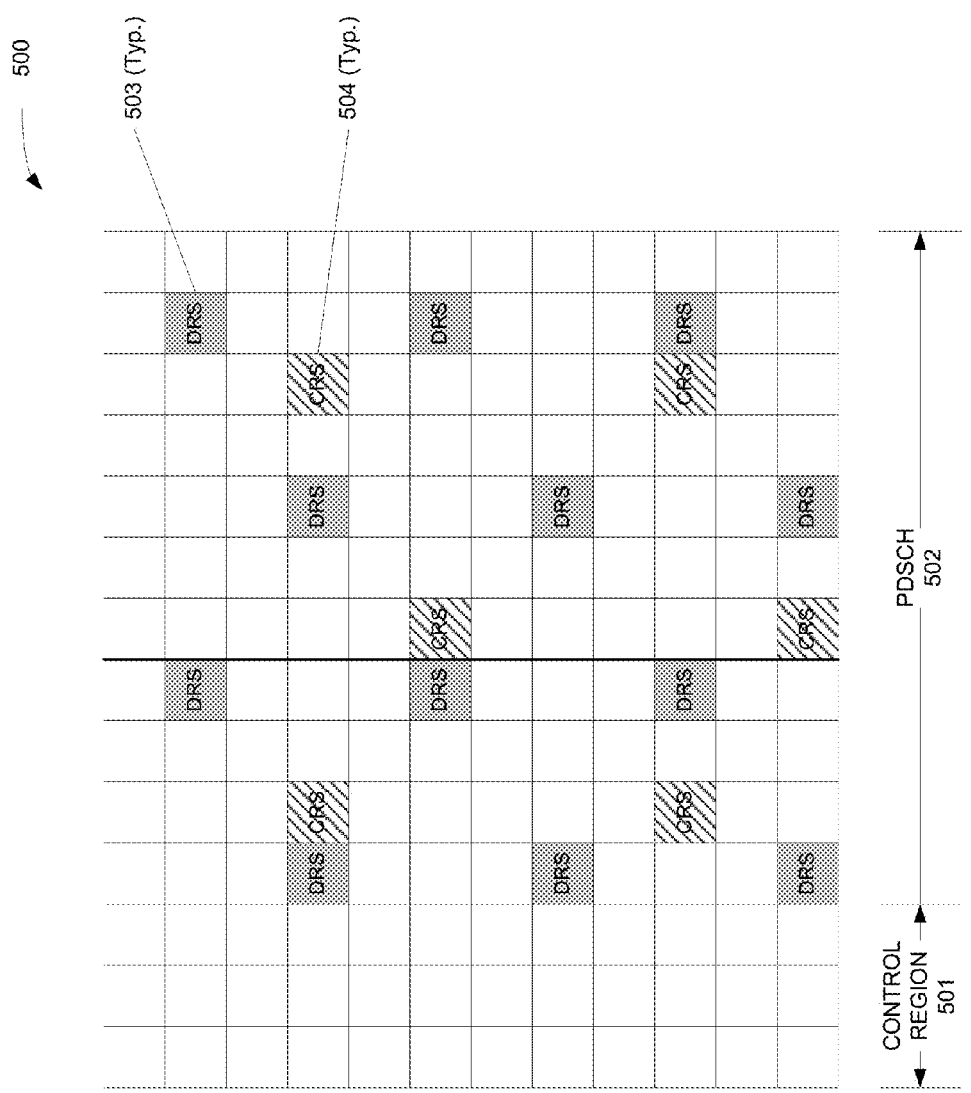
FIG. 5 illustrates a resource block.

A conventional LTE Rel-8 downlink resource block (RB) also includes demodulation reference symbols (DM-RS) and common reference symbols (CRS) intermixed with data symbols (resource elements) in the PDSCH. Demodulation reference symbols are dedicated reference symbols (hereinafter DRSs) that are coded for a specific UE. Common reference symbols are cell specific (i.e., common to all UEs served by a base station). The DRSs and CRSs allow the UE to estimate channel quality and to decode/demodulate the UE's data symbols accordingly. FIG. 5 illustrates such a RB 500. In FIG. 5, the control region 501 of the conventional LTE Rel-8 RB contains no DRSs. The PDSCH 502 of the conventional LTE Rel-8 RB includes a configuration of DRSs 503 and a configuration of CRSs 504 that depends on the rank of the downlink transmission mode. Rank is a measure of the number of spatial layers used in the downlink and is directly related to the number of antennas used by a base station, such as base station 310, to communicate with a UE. In FIG. 5, the configuration of DRSs and CRSs is an exemplary configuration for a rank 1 transmission.

Figure 6:
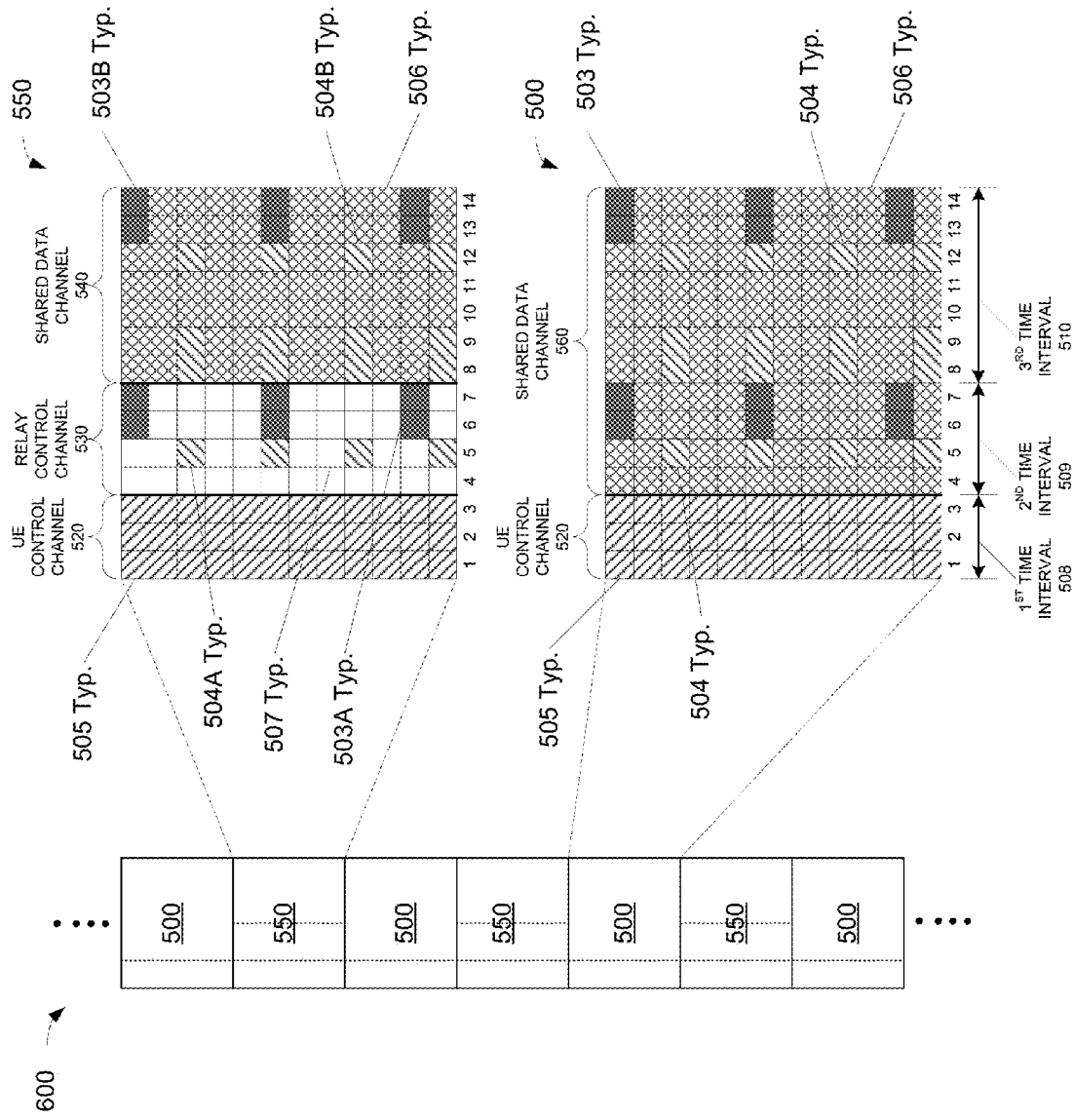
FIG. 6 illustrates an exemplary distribution of resource blocks in one embodiment.

FIG. 6 illustrates an exemplary array of resource blocks 600 transmitted from a base station, such as base station 310, to a relay node, such as relay node 320, in a transmission subframe (e.g., see FIG. 4). RB array 600 comprises a first plurality of resource blocks 550, frequency multiplexed with a second plurality of conventional resource blocks 500.

In one embodiment, a relay node, such as relay node 320, receives the first plurality of resource blocks 550, frequency multiplexed in the transmission subframe, where the first plurality of resource blocks 550 spans less than a full transmission bandwidth, and where the first plurality of resource blocks 550 includes a UE control channel 520 and a plurality of control symbols 505 in a first time interval 508, a relay control channel 530 and a first plurality of dedicated reference symbols 503A in a second time interval 509, and a shared data channel 540 and a second plurality of dedicated reference symbols 503B in a third time interval 510. In one embodiment, the relay node 320 is configured to decode relay control information 507 from the relay control channel 530 and to decode relay data and user data 506 from the shared data channel 540.

The second time interval 509 may include a plurality of common reference symbols (CRSs) 504A configured to decode relay control information from the relay control channel 530, the first plurality of dedicated reference symbols 503A may be configured to decode the relay data from the shared data channel 540, and the second plurality of dedicated reference symbols 503B may be configured to decode the relay data from the shared data channel 540.

In one embodiment, the first plurality of dedicated reference symbols 503A and the second plurality of dedicated reference symbols 503B may be configured to support a multi-layer transmission mode. For example, each OFDM symbol occupied by a dedicated reference symbol 503A or 503B may each correspond to a different spatial layer (e.g., 4 layers as illustrated in FIG. 6 at OFDM symbols 6, 7, 13 and 14). In one embodiment, the first plurality of dedicated reference symbols 503A may be configured to decode the relay control information from the relay control channel 530 in a first spatial layer and the second plurality of dedicated reference symbols 503B may be configured to decode the relay data from the shared data channel 540 in a second spatial layer.

In one embodiment, the first plurality 503A and second plurality 503B of dedicated reference symbols may be scrambled (i.e., coded) and power-controlled to match dedicated reference symbols in resource blocks, such as resource blocks 500, without relay control channels.

In one embodiment, the first plurality of dedicated reference symbols 503A may be configured to decode the relay control information from the relay control channel 530 and the second plurality of dedicated reference symbols 503B may be configured to decode the relay data from the shared data channel 540. Alternatively, the first plurality 503A and the second plurality 503B of dedicated reference symbols may be configured to jointly decode the relay control information from the relay control channel 530. In another embodiment, the first plurality 503A and the second plurality 503B of dedicated reference symbols may be jointly configured to decode the relay data from the shared data channel 540.

In one embodiment, the relay node receives a second plurality of resource blocks (e.g., resource blocks 500) in the transmission subframe, where the second plurality of resource blocks comprises a shared data channel 560 in the second and third time intervals 509 and 510. To minimize power variations, the power level of selected resource elements in the second time interval 509 may be controlled to equalize the power spectral density across OFDM symbols in the second time interval 509 and the third time interval 510 of the second plurality of resource blocks.

Together, the first plurality of resource blocks and the second plurality of resource blocks span the full transmission bandwidth of the system. To minimize power fluctuations over time, the power level of selected resource elements in the second time interval 509 of the first plurality of resource blocks may be controlled to equalize the power spectral density across the full bandwidth of OFDM symbols in the first time interval 508, the second time interval 509 and the third time interval 510.

It will be appreciated that a base station acting as a donor node, such as base station 310, may be configured to transmit the resource blocks 500 and 550 described above.

After the relay node (e.g., relay node 320) receives and decodes the relay control information and the relay data from the plurality of resource blocks 500 and 550, the relay node forwards (i.e., retransmits) the resource blocks to a user equipment, such as UE 330, for example. As such, from the point of view of the user equipment, the relay node can operate as a base station that transmits data and control information to the UE (e.g., 330) in the downlink (e.g., 370) in a traditional LTE format. Accordingly, the UE receives a plurality of resource blocks (e.g., 500), which may be delayed in time by the relay node. The plurality of resource blocks that are received by the UE comprise the UE control channel (e.g., 520) information, a plurality of common reference symbols (e.g. 504A), a plurality dedicated reference symbols (e.g., 503) and a plurality of shared data channel user data (e.g., 506). The UE may then be configured to decode the control information from the UE control channel 520 in the first time interval 508 and to decode user data from the shared data channel 560 in the third time interval 510.

In some embodiments, the UE may be configured to reuse the common reference symbols 504A and 504B, and the dedicated reference symbols 503A and 503B, to decode the user data. In one embodiment, the first plurality of dedicated reference symbols 503A may be used to decode the user data from the shared data channel 560 received by the UE. In another embodiment, the second plurality of dedicated reference symbols 503B may be used to decode the user data from the shared data channel 560 received by the UE. In another embodiment, the first plurality 503A and the second plurality 503B of dedicated reference symbols may be used jointly to decode the user data from the shared data channel 560 received by the UE.

In yet another embodiment, the first plurality of dedicated reference symbols 503A may be used by the UE to decode the user data from the shared data channel 560 in a first spatial layer, and the second plurality of dedicated reference symbols 503B may be used to decode the user data from the shared data channel 560 in a second spatial layer.

The UE can also receive a second plurality of resource blocks (e.g., 500) in the same transmission subframe, where the second plurality of resource blocks comprises the shared data channel 560 in the second and third time intervals, 509 and 510. In such a configuration, at least some of the resource elements in the second time interval 509 comprise user data. As described above, the power level of selected resource elements in the second time interval 509 may be controlled to equalize the power spectral density across OFDM symbols in the second time interval 509 and the third time interval 510 of the second plurality of resource blocks.

Additionally, because all of the resource elements in, for example, the second time interval 509 may not be used by the UE (e.g., those resource elements that were decoded and used by the relay node only), the power level of selected resource elements transmitted to the UE may be boosted to equalize the power spectral density across OFDM symbols in the first time interval 508, the second time interval 509 and the third time interval 510 across the full transmission bandwidth spanned by the plurality of resource blocks 500.

Figure 7:
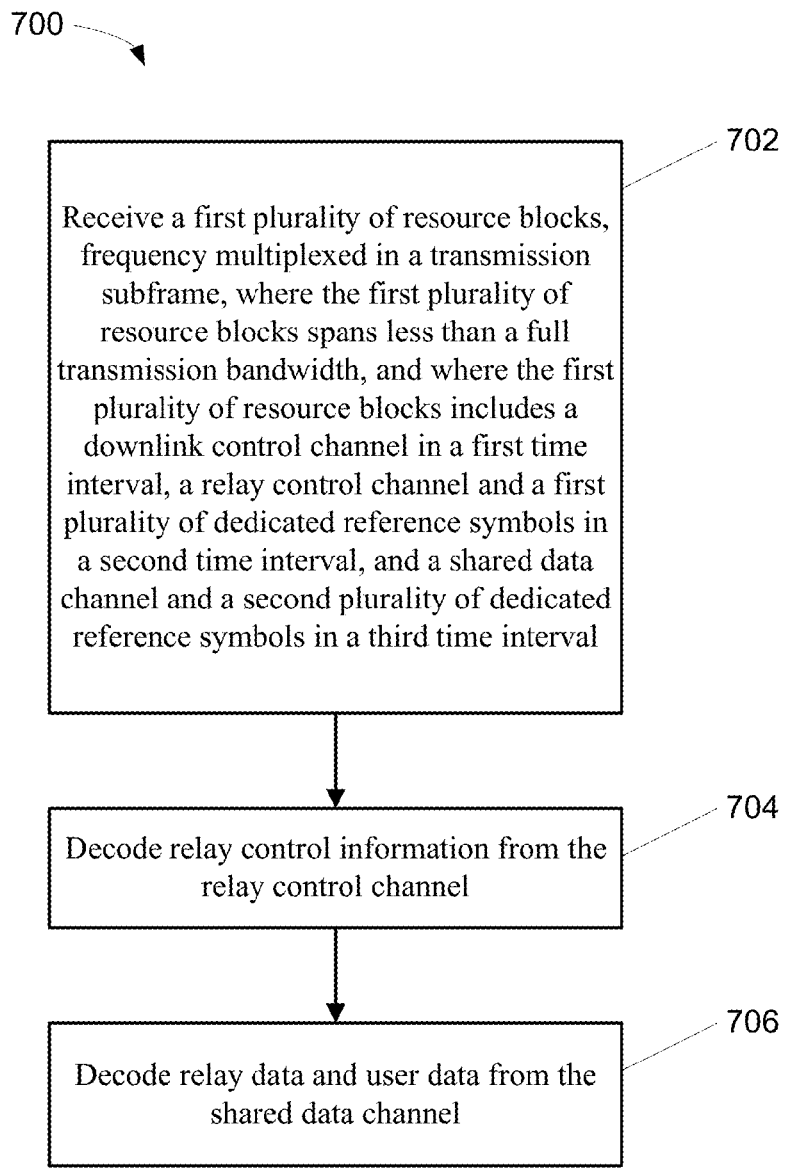
FIG. 7 is a flowchart illustrating a method in a relay node in one embodiment.

FIG. 7 is a flowchart illustrating a method 700 in a relay node according to one embodiment. The method 700 begins at operation 702 where the relay node receives a first plurality of resource blocks, frequency multiplexed in a transmission subframe, where the first plurality of resource blocks spans less than a full transmission bandwidth, and where the first plurality of resource blocks comprises a user equipment (UE) control channel in a first time interval, a relay control channel and a first plurality of dedicated reference symbols in a second time interval, and a shared data channel and a second plurality of dedicated reference symbols in a third time interval. The first plurality of resource blocks may also comprise a plurality of common reference symbols in the first time interval. In operation 704, the relay node decodes relay control information from the relay control channel and, in operation 706, the relay node decodes relay data and user data from the shared data channel.

Figure 8:
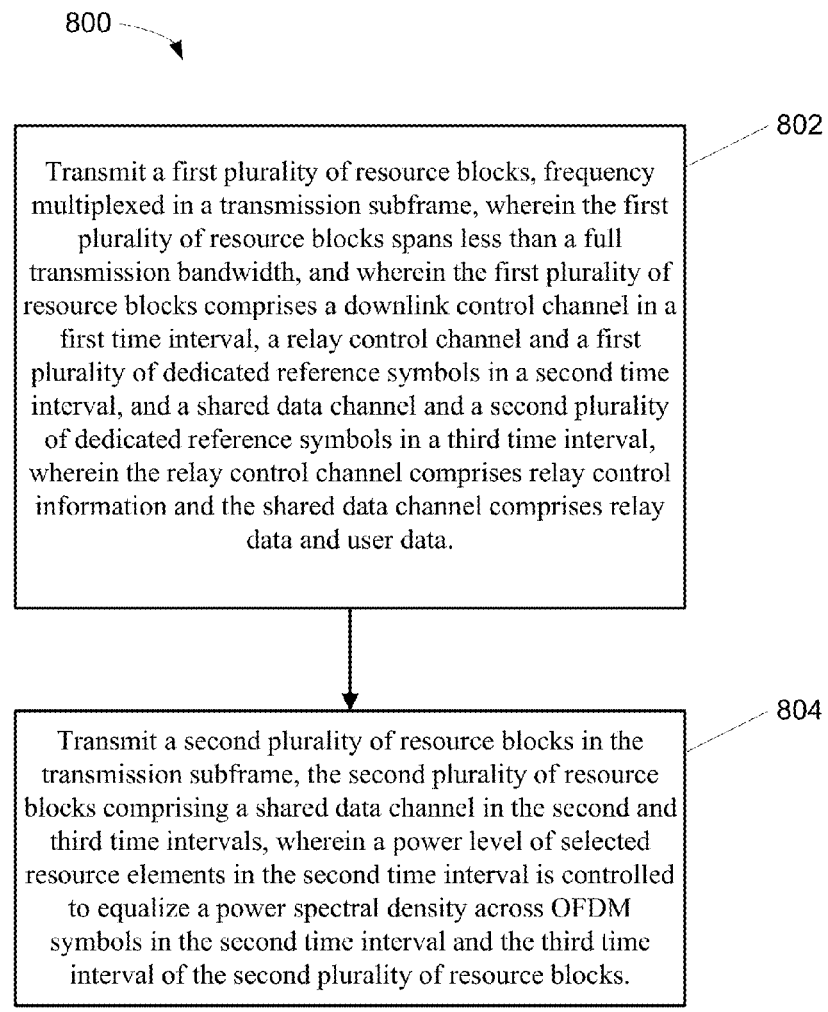
FIG. 8 is a flowchart illustrating a method in a base station in one embodiment.

FIG. 8 is a flowchart illustrating a method 800 in a base station according to one embodiment. Method 800 begins at operation 802 where the base station transmits a first plurality of resource blocks, frequency multiplexed in a transmission subframe, wherein the first plurality of resource blocks spans less than a full transmission bandwidth, and where the first plurality of resource blocks comprises a UE control channel in a first time interval, a relay control channel and a first plurality of dedicated reference symbols in a second time interval, and a shared data channel and a second plurality of dedicated reference symbols in a third time interval, where the relay control channel comprises relay control information and the shared data channel comprises relay data and user data. The first plurality of resource blocks may also comprise a plurality of common reference symbols in the first time interval. The method concludes at operation 804, where the base station transmits a second plurality of resource blocks in the transmission subframe, the second plurality of resource blocks comprising a shared data channel in the second and third time intervals, where a power level of selected resource elements in the second time interval is controlled to equalize a power spectral density across OFDM symbols in the second time interval and the third time interval of the second plurality of resource blocks.

Figure 9:
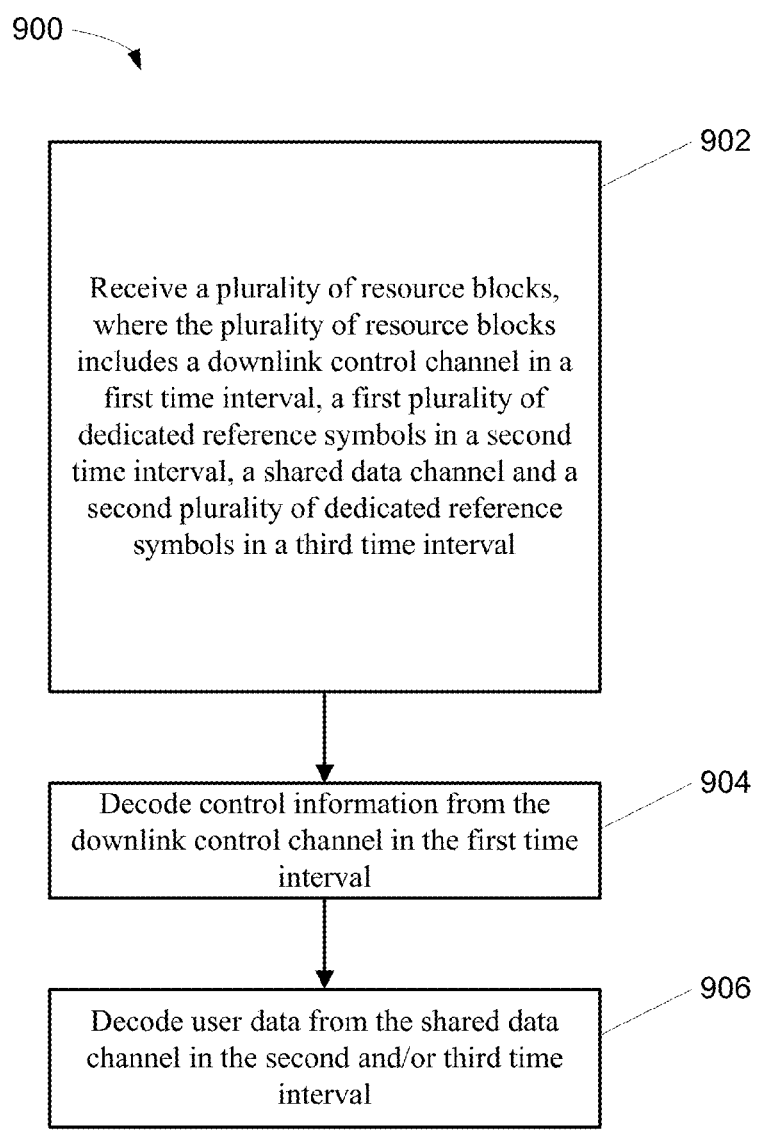
FIG. 9 is a flowchart illustrating a method in a user equipment in one embodiment.

FIG. 9 is a flowchart illustrating a method 900 in a user equipment (UE) according to one embodiment. Method 900 begins at operation 902, where the UE receives a plurality of resource blocks, the plurality of resource blocks comprises a UE control channel in a first time interval, a first plurality of dedicated reference symbols in a second time interval, and a shared data channel and a second plurality of dedicated reference symbols in a third time interval. The plurality of resource blocks may also comprise a plurality of common reference symbols in the first time interval. At operation 904, the UE decodes control information from the UE control channel in the first time interval. At operation 906 the UE decodes user data from the shared data channel in the second and/or third time interval.

Figure 10:
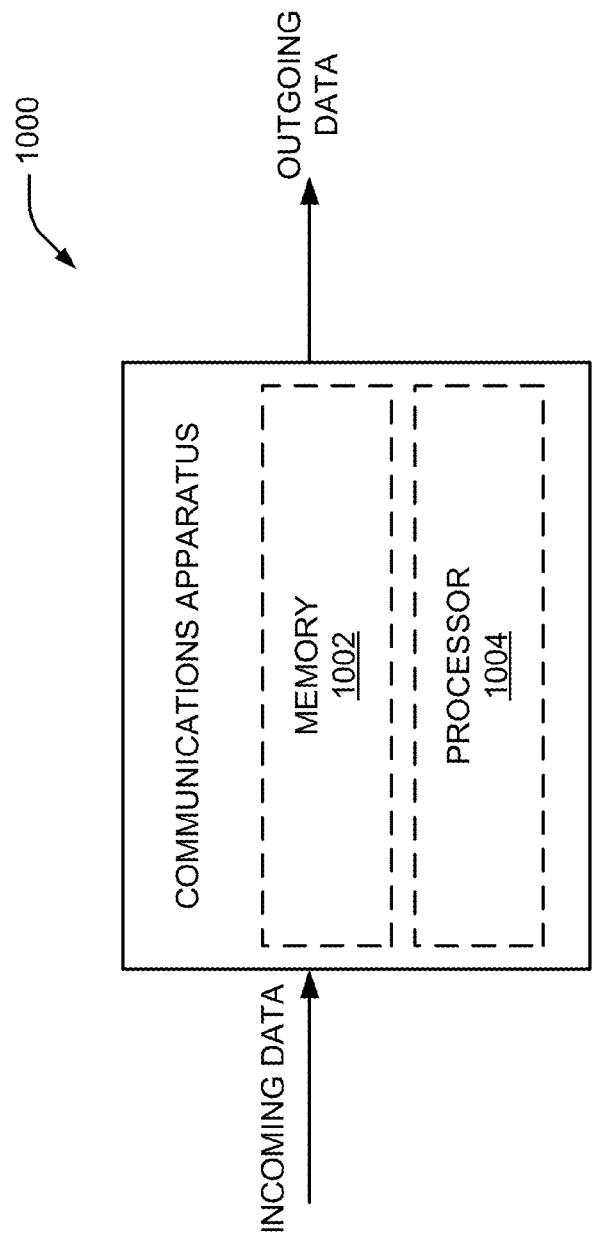
FIG. 10 illustrates a wireless communications apparatus in one embodiment.

FIG. 10 illustrates an apparatus 1000 within which the various disclosed embodiments may be implemented. In particular, the apparatus 1000 that is shown in FIG. 10 may comprise at least a portion of a relay node, at least a portion of a base station or at least a portion of a user equipment (such as the relay node 320, base station 310 and the user equipment 330 that are depicted in FIG. 3) and/or at least a portion of a transmitter system or a receiver system (such as the transmitter system 210 and the receiver system 250 that are depicted in FIG. 2). The apparatus 1000 that is depicted in FIG. 10 can be resident within a wireless network and receive incoming data via, for example, one or more receivers and/or the appropriate reception and decoding circuitry (e.g., antennas, transceivers, demodulators and the like). The apparatus 1000 that is depicted in FIG. 10 can also transmit outgoing data via, for example, one or more transmitters and/or the appropriate encoding and transmission circuitry (e.g., antennas, transceivers, modulators and the like). Additionally, or alternatively, the apparatus 1000 that is depicted in FIG. 10 may be resident within a wired network.

FIG. 10 further illustrates that the apparatus 1000 can include a memory 1002 that can retain instructions for performing one or more operations, such as signal conditioning, analysis and the like. Additionally, the apparatus 1000 of FIG. 10 may include a processor 1004 that can execute instructions that are stored in the memory 1002 and/or instructions that are received from another device. The instructions can relate to, for example, configuring or operating the apparatus 1000 or a related communications apparatus. It should be noted that while the memory 1002 that is depicted in FIG. 10 is shown as a single block, it may comprise two or more separate memories that constitute separate physical and/or logical units. In addition, the memory while being communicatively coupled to the processor 1004, may reside fully or partially outside of the apparatus 1000 that is depicted in FIG. 10. It is also to be understood that one or more components, such as the coding and modulation component 313, the codec/modem component 323 and the decoding and demodulation component 333 that are shown in FIG. 3, can exist within a memory such as memory 1002.

Figure 11:
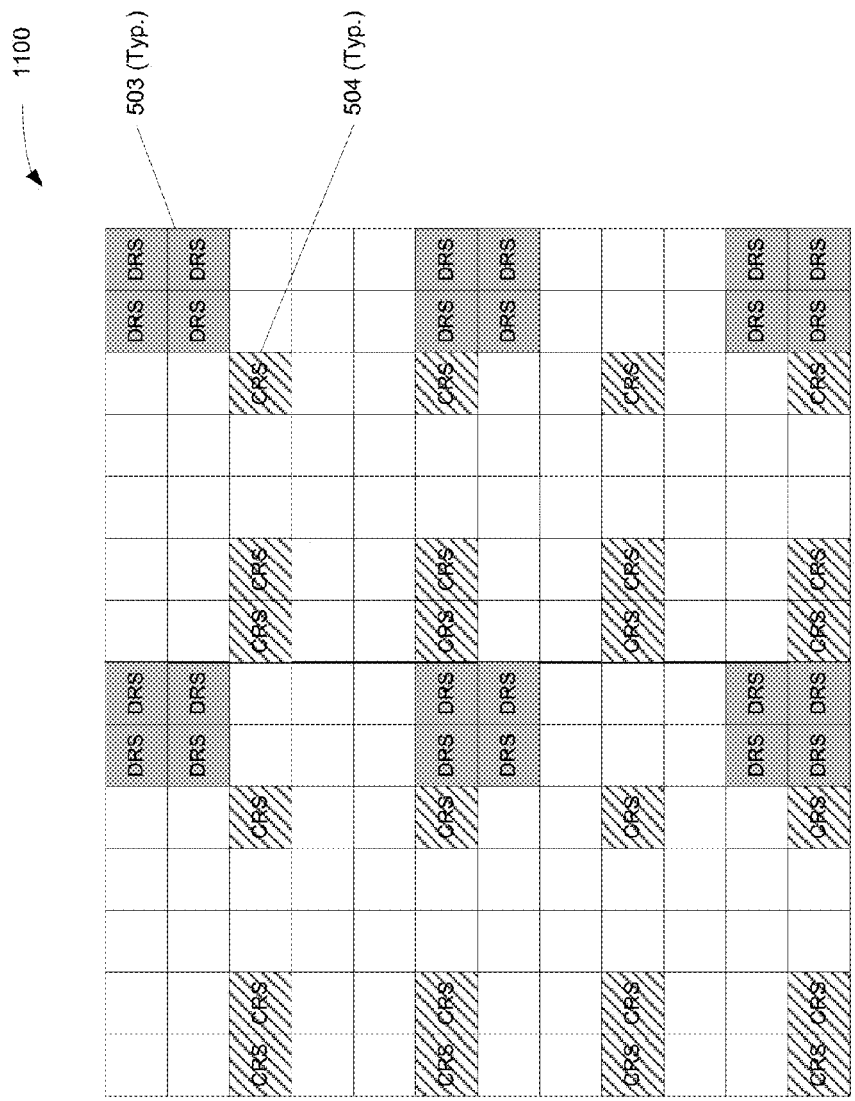
FIG. 11 illustrates another exemplary distribution of resource blocks in one embodiment.
Figure 12:
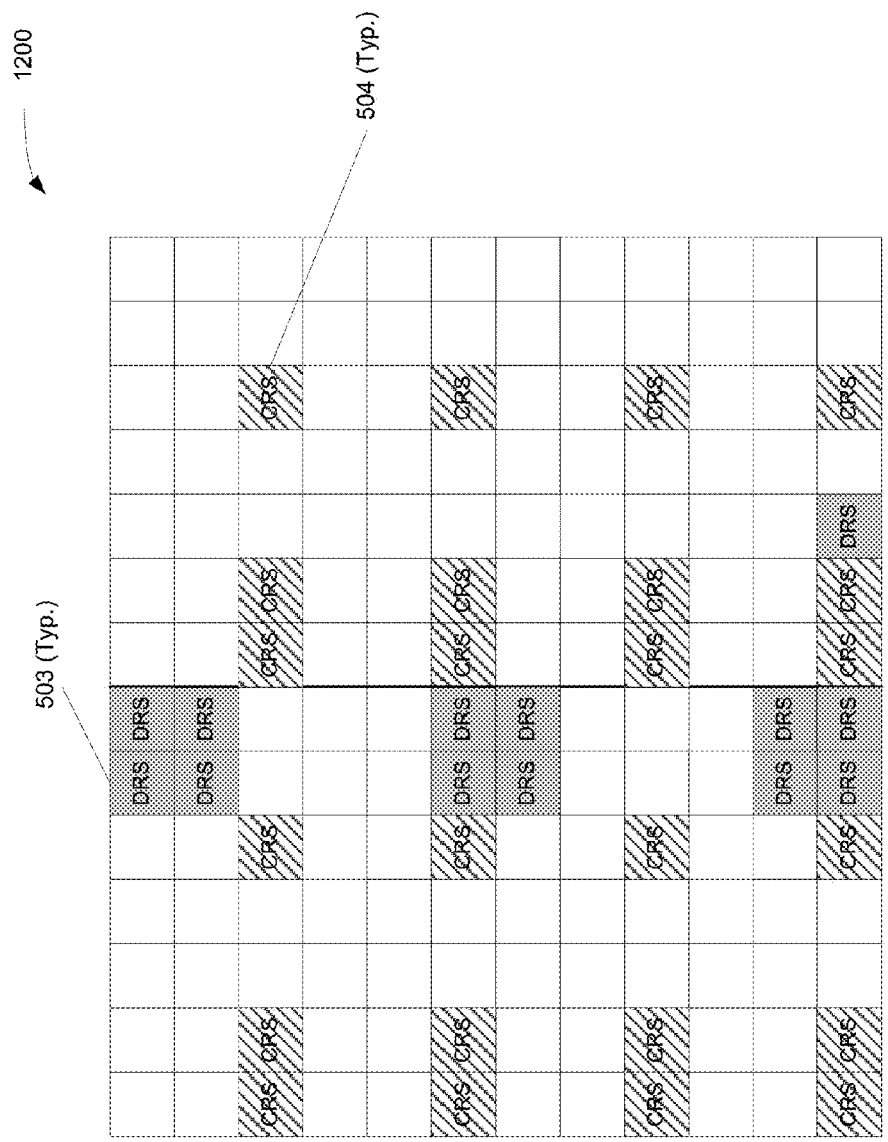
FIG. 12 illustrates another exemplary distribution of resource blocks in one embodiment.

It should be noted that while FIG. 6 represents one exemplary DRS pattern in an array of resource blocks that can be utilized in the disclosed system and methods of the present application, the disclosed embodiments can be readily implemented in conjunction with additional or alternate DRS patterns. For example, FIGS. 11 through 16 illustrate additional exemplary DRS patterns that can be used in accordance with the disclosed embodiments. In particular, FIG. 11 illustrates an array of resource blocks 1100 (with normal cyclic prefix) that comprise six groups of four (i.e., 24) dedicated reference symbols 503 and 24 common reference symbols 504. FIG. 12 illustrates another array of resource blocks 1200 with an alternate pattern of dedicated reference symbols 503 that includes a reduced number (i.e., 12) of DRS symbols.

Figure 13:
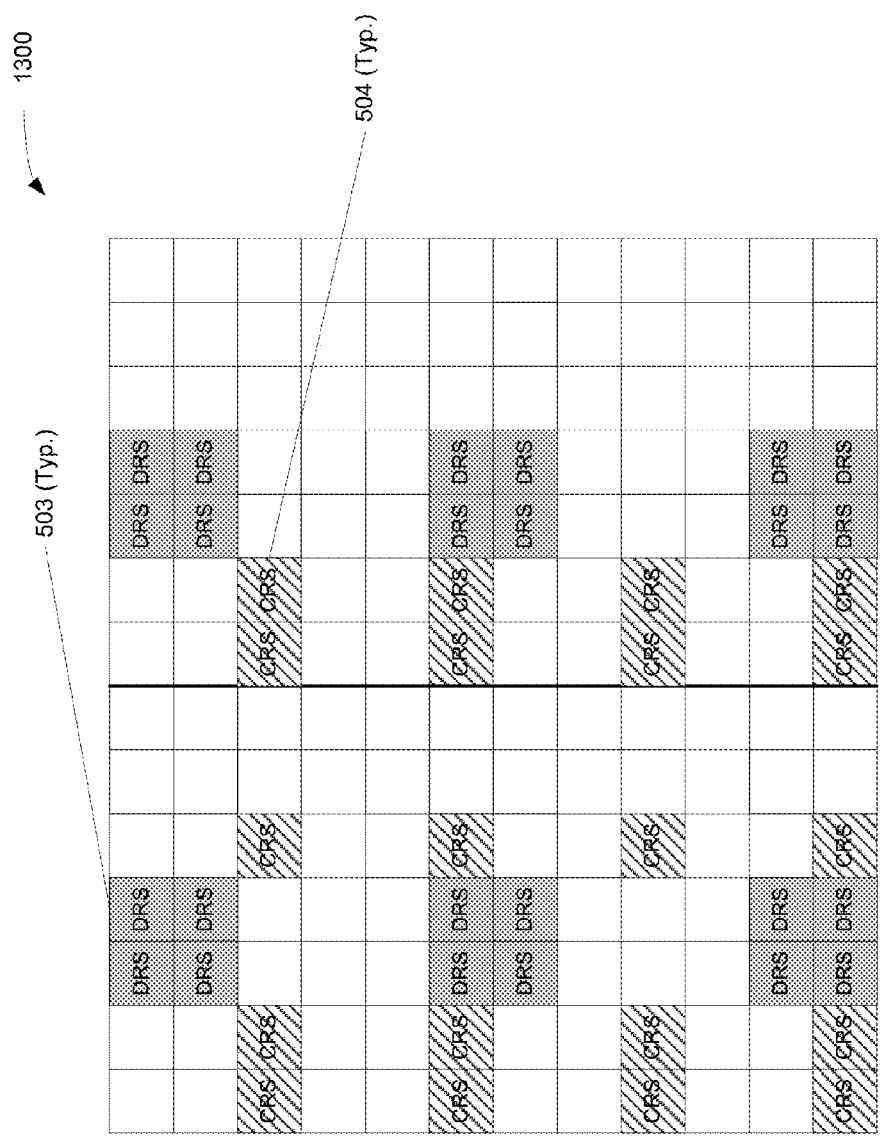
FIG. 13 illustrates another exemplary distribution of resource blocks in one embodiment.
Figure 14:
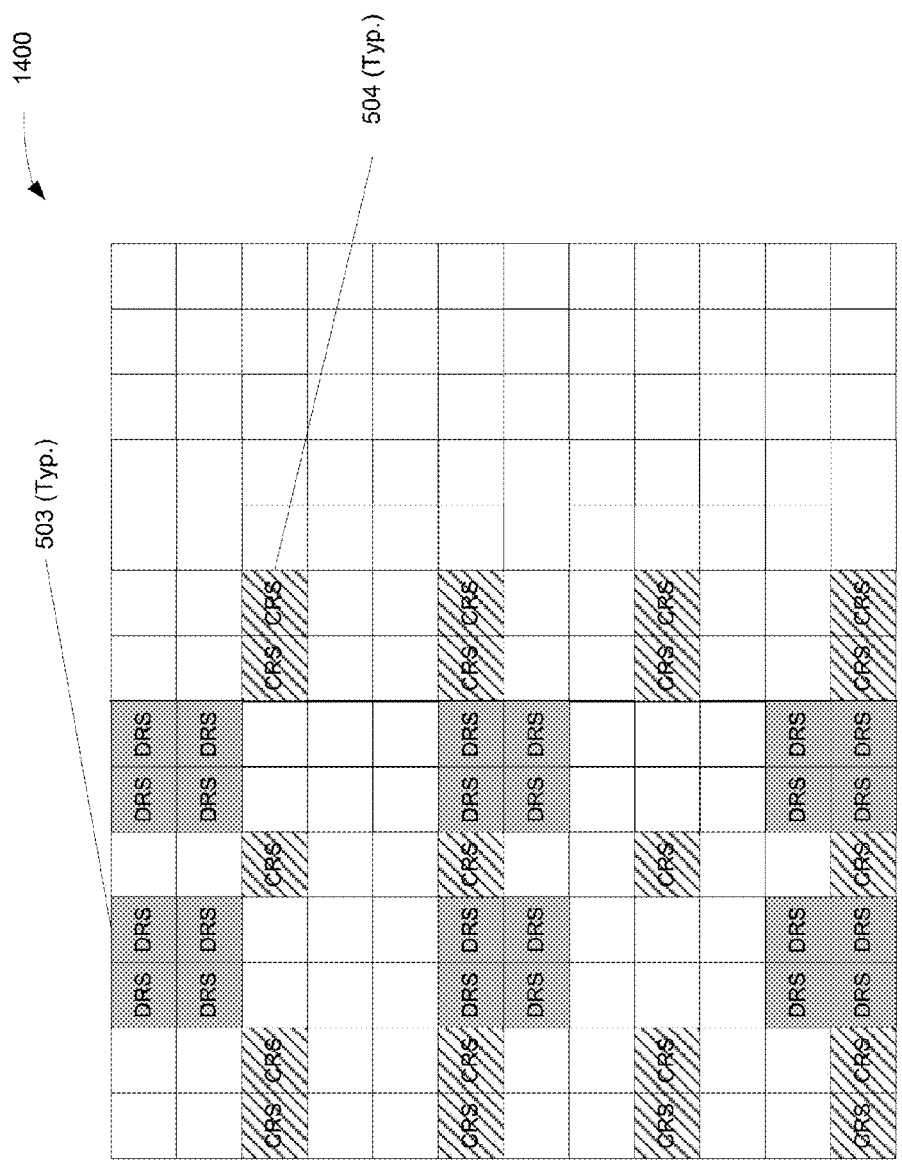
FIG. 14 illustrates another exemplary distribution of resource blocks in one embodiment.
Figure 15:
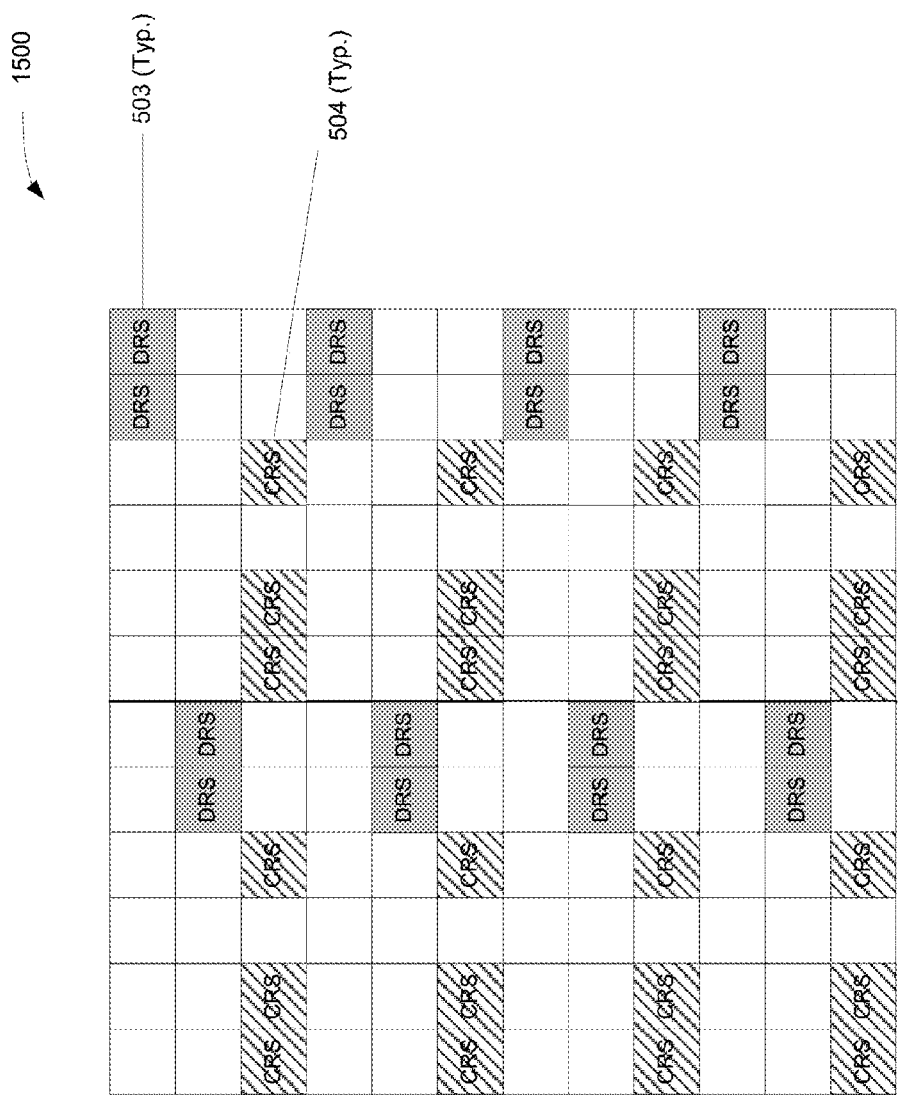
FIG. 15 illustrates another exemplary distribution of resource blocks in one embodiment.
Figure 16:
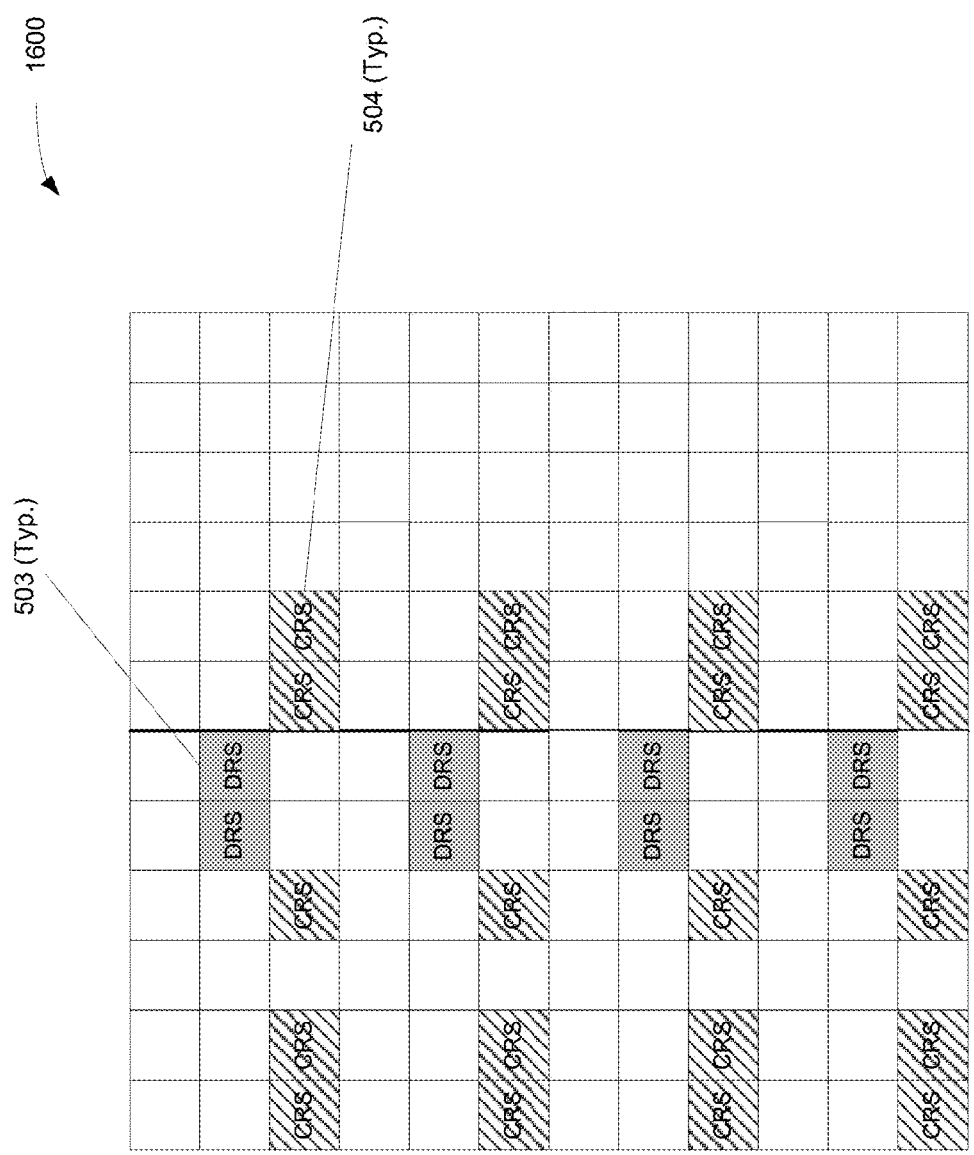
FIG. 16 illustrates another exemplary distribution of resource blocks in one embodiment.

FIG. 13 illustrates another exemplary array of resource blocks 1300 with another pattern of reference symbols that can be used in special subframes (e.g., downlink pilot time slot (DwPTS)) with 11 or 12 OFDM symbols. FIG. 14 illustrates yet another exemplary array of resource blocks 1400 with a pattern of reference symbols that can be used in DwPTS with 9 or 10 OFDM symbols. The disclosed embodiments can further be used in conjunction with different pattern of reference symbols that are used in subframes with extended cyclic prefix. For example, FIG. 15 illustrates an array of resource blocks 1500 with extended prefix that utilize a staggered pattern of dedicated reference symbols 503. FIG. 16 further illustrates an exemplary array of resource blocks 1600 associated with a special subframe (e.g., DwPTS) with 8, 9 or 10 OFDM symbols. FIGS. 15 and 16 can be used for ranks 1 and 2. It should be noted that while FIGS. 6 and 11 through 16 illustrate a number of exemplary reference signal patterns, the disclosed embodiments can be used in conjunction with additional reference signal patterns that are not explicitly shown in the accompanying figures.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which may act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 1000 of FIG. 10 can be employed with a user equipment or mobile device, and can be, for instance, a module such as an SD card, a network card, a wireless network card, a computer (including laptops, desktops, personal digital assistants (PDAs)), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base station may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers/processors in networked environments. A memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization, is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but may not be limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g., 330 of FIG. 3). In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method, comprising:
   receiving a first plurality of resource blocks, frequency multiplexed in a transmission subframe, wherein the first plurality of resource blocks spans less than a full transmission bandwidth, wherein the first plurality of resource blocks comprises a user equipment (UE) control channel in a first time interval spanning three OFDM symbols, a relay control channel and a first plurality of dedicated reference symbols in a second time interval following the first time interval and spanning four OFDM symbols, and a shared data channel and a second plurality of dedicated reference symbols in a third time interval, and wherein the first plurality of resource blocks lacks a shared data channel in the second time interval;
   decoding relay control information from the relay control channel;
   decoding relay data and user data from the shared data channel; and
   receiving a second plurality of resource blocks in the transmission subframe, the second plurality of resource blocks frequency multiplexed with the first plurality of resource blocks and comprising a shared data channel in the second and third time intervals,
   wherein at least two of the first plurality of dedicated reference symbols in the second time interval are mapped to time-adjacent symbols, and at least two of the second plurality of dedicated reference symbols in the third time interval are mapped to time-adjacent symbols.

2. The method of claim 1, wherein the second time interval further comprises a plurality of common reference symbols configured to decode the relay control information from the relay control channel.

3. The method of claim 2, wherein the first plurality of dedicated reference symbols is configured to decode the relay data from the shared data channel.

4. The method of claim 3, wherein the second plurality of dedicated reference symbols is configured to decode the relay data from the shared data channel.

5. The method of claim 1, wherein the first plurality of dedicated reference symbols and the second plurality of dedicated reference symbols are configured to support a multi-layer transmission mode.

6. The method of claim 1, wherein the first plurality and second plurality of dedicated reference symbols are scrambled and power-controlled to match dedicated reference symbols in resource blocks without relay control channels.

7. The method of claim 1, wherein the first plurality of dedicated reference symbols is configured to decode the relay control information from the relay control channel and the second plurality of dedicated reference symbols is configured to decode the relay data from the shared data channel.

8. The method of claim 1, wherein the first plurality and the second plurality of dedicated reference symbols are configured to decode the relay control information from the relay control channel.

9. The method of claim 1, wherein the first plurality and the second plurality of dedicated reference symbols are configured to decode the relay data from the shared data channel.

10. The method of claim 1, wherein the first plurality of dedicated reference symbols is configured to decode the relay control information from the relay control channel in a first spatial layer, and the second plurality of dedicated reference symbols is configured to decode the relay data from the shared data channel in a second spatial layer.

11. The method of claim 1, further comprising forwarding UE control information and the user data to a user equipment.

12. The method of claim 1, wherein the first plurality of resource blocks and the second plurality of resource blocks jointly span the full transmission bandwidth, and wherein a power level of selected resource elements in the second time interval of the first plurality of resource blocks is controlled to equalize a power spectral density across OFDM symbols in the first time interval, the second time interval and the third time interval.

13. A relay node, comprising:
   means for receiving a first plurality of resource blocks, frequency multiplexed in a transmission subframe, wherein the first plurality of resource blocks spans less than a full transmission bandwidth, wherein the first plurality of resource blocks comprises a UE control channel in a first time interval spanning three OFDM symbols, a relay control channel and a first plurality of dedicated reference symbols in a second time interval following the first time interval and spanning four OFDM symbols, and a shared data channel and a second plurality of dedicated reference symbols in a third time interval, and wherein the first plurality of resource blocks lacks a shared data channel in the second time interval;
   means for decoding relay control information from the relay control channel;
   means for decoding relay data and user data from the shared data channel; and means for receiving a second plurality of resource blocks in the transmission subframe, the second plurality of resource blocks frequency multiplexed with the first plurality of resource blocks and comprising a shared data channel in the second and third time intervals, wherein at least two of the first plurality of dedicated reference symbols in the second time interval are mapped to time-adjacent symbols, and at least two of the second plurality of dedicated reference symbols in the third time interval are mapped to time-adjacent symbols.

14. The relay node of claim 13, wherein the first plurality of resource blocks and the second plurality of resource blocks jointly span the full transmission bandwidth, and wherein a power level of selected resource elements in the second time interval of the first plurality of resource blocks is controlled to equalize a power spectral density across OFDM symbols in the first time interval, the second time interval and the third time interval.

15. A non-transitory computer-readable storage medium, comprising:

program code for receiving a first plurality of resource blocks, frequency multiplexed in a transmission subframe, wherein the first plurality of resource blocks spans less than a full transmission bandwidth, wherein the first plurality of resource blocks comprises a UE control channel in a first time interval spanning three OFDM symbols, a relay control channel and a first plurality of dedicated reference symbols in a second time interval following the time interval and spanning four OFDM symbols, and a shared data channel and a second plurality of dedicated reference symbols in a third time interval, and wherein the first plurality of resource blocks lacks a shared data channel in the second time interval;

program code for decoding relay control information from the relay control channel;

program code for decoding relay data and user data from the shared data channel; and program code for receiving a second plurality of resource blocks in the transmission subframe, the second plurality of resource blocks frequency multiplexed with the first plurality of resource blocks and comprising a shared data channel in the second and third time intervals, wherein at least two of the first plurality of dedicated reference symbols in the second time interval are mapped to time-adjacent symbols, and at least two of the second plurality of dedicated reference symbols in the third time interval are mapped to time-adjacent symbols.

16. The non-transitory computer-readable storage medium of claim 15, wherein the first plurality of resource blocks and the second plurality of resource blocks jointly span the full transmission bandwidth, and wherein a power level of selected resource elements in the second time interval of the first plurality of resource blocks is controlled to equalize a power spectral density across OFDM symbols in the first time interval, the second time interval and the third time interval.

17. A relay node, comprising:

a processor; and a memory comprising processor executable instructions that, when executed by the processor, configures the relay node to:

receive a first plurality of resource blocks, frequency multiplexed in a transmission subframe, wherein the first plurality of resource blocks spans less than a full transmission bandwidth, wherein the first plurality of resource blocks comprises a UE control channel in a first time interval spanning three OFDM symbols, a relay control channel and a first plurality of dedicated reference symbols in a second time interval following the first time interval and spanning four OFDM symbols, and a shared data channel and a second plurality of dedicated reference symbols in a third time interval, and wherein the first plurality of resource blocks lacks a shared data channel in the second time interval;

decode relay control information from the relay control channel;

decode relay data and user data from the shared data channel; and receive a second plurality of resource blocks in the transmission subframe, the second plurality of resource blocks frequency multiplexed with the first plurality of resource blocks and comprising a shared data channel in the second and third time intervals, wherein at least two of the first plurality of dedicated reference symbols in the second time interval are mapped to time-adjacent symbols, and at least two of the second plurality of dedicated reference symbols in the third time interval are mapped to time-adjacent symbols.

18. The relay node of claim 17, wherein the first plurality of resource blocks and the second plurality of resource blocks jointly span the full transmission bandwidth, and wherein a power level of selected resource elements in the second time interval of the first plurality of resource blocks is controlled to equalize a power spectral density across OFDM symbols in the first time interval, the second time interval and the third time interval.

19. A method, comprising:

transmitting a first plurality of resource blocks, frequency multiplexed in a transmission subframe, wherein the first plurality of resource blocks spans less than a full transmission bandwidth, wherein the first plurality of resource blocks comprises a UE control channel in a first time interval spanning three OFDM symbols, a relay control channel and a first plurality of dedicated reference symbols in a second time interval following the first time interval and spanning four OFDM symbols, and a shared data channel and a second plurality of dedicated reference symbols in a third time interval, wherein the relay control channel comprises relay control information and the shared data channel comprises relay data and user data, and wherein the first plurality of resource blocks lacks a shared data channel in the second time interval; and transmitting a second plurality of resource blocks in the transmission subframe, the second plurality of resource blocks frequency multiplexed with the first plurality of resource blocks and comprising a shared data channel in the second and third time intervals, wherein at least two of the first plurality of dedicated reference symbols in the second time interval are mapped to time-adjacent symbols, and at least two of the second plurality of dedicated reference symbols in the third time interval are mapped to time-adjacent symbols.

20. The method of claim 19, wherein the first plurality of resource blocks and the second plurality of resource blocks jointly span the full transmission bandwidth, and wherein a power level of selected resource elements in the second time interval of the first plurality of resource blocks is controlled to equalize a power spectral density across OFDM symbols in the first time interval, the second time interval and the third time interval.

21. A base station, comprising:
means for transmitting a first plurality of resource blocks, frequency multiplexed in a transmission subframe, wherein the first plurality of resource blocks spans less than a full transmission bandwidth, wherein the first plurality of resource blocks comprises a UE control channel in a first time interval spanning three OFDM symbols, a relay control channel and a first plurality of dedicated reference symbols in a second time interval following the first time interval and spanning four OFDM symbols, and a shared data channel and a second plurality of dedicated reference symbols in a third time interval, wherein the relay control channel comprises relay control information and the shared data channel comprises relay data and user data, and wherein the first plurality of resource blocks lacks a shared data channel in the second time interval; and
means for transmitting a second plurality of resource blocks in the transmission subframe, the second plurality of resource blocks frequency multiplexed with the first plurality of resource blocks and comprising a shared data channel in the second and third time intervals.

22. The base station of claim 21, wherein the first plurality of resource blocks and the second plurality of resource blocks jointly span the full transmission bandwidth, and wherein a power level of selected resource elements in the second time interval of the first plurality of resource blocks is controlled to equalize a power spectral density across OFDM symbols in the first time interval, the second time interval and the third time interval.

23. A non-transitory computer-readable storage medium, comprising:
program code for transmitting a first plurality of resource blocks, frequency multiplexed in a transmission subframe, wherein the first plurality of resource blocks spans less than a full transmission bandwidth, wherein the first plurality of resource blocks comprises a UE control channel in a first time interval spanning three OFDM symbols, a relay control channel and a first plurality of dedicated reference symbols in a second time interval following the first time interval and spanning four OFDM symbols, and a shared data channel and a second plurality of dedicated reference symbols in a third time interval, wherein the relay control channel comprises relay control information and the shared data channel comprises relay data and user data, and wherein the first plurality of resource blocks lacks a shared data channel in the second time interval; and
program code for transmitting a second plurality of resource blocks in the transmission subframe, the second plurality of resource blocks frequency multiplexed with the first plurality of resource blocks and comprising a shared data channel in the second and third time intervals,
wherein at least two of the first plurality of dedicated reference symbols in the second time interval are mapped to time-adjacent symbols, and at least two of the second plurality of dedicated reference symbols in the third time interval are mapped to time-adjacent symbols.

24. The non-transitory computer-readable storage medium of claim 23, wherein the first plurality of resource blocks and the second plurality of resource blocks jointly span the full transmission bandwidth, and wherein a power level of selected resource elements in the second time interval of the first plurality of resource blocks is controlled to equalize a power spectral density across OFDM symbols in the first time interval, the second time interval and the third time interval.

25. A base station, comprising:
a processor; and
a memory comprising processor executable instructions that, when executed by the processor, configures the base station to:
transmit a first plurality of resource blocks, frequency multiplexed in a transmission subframe, wherein the first plurality of resource blocks spans less than a full transmission bandwidth, wherein the first plurality of resource blocks comprises a UE control channel in a first time interval spanning three OFDM symbols, a relay control channel and a first plurality of dedicated reference symbols in a second time interval following the first time interval and spanning four OFDM symbols, and a shared data channel and a second plurality of dedicated reference symbols in a third time interval, wherein the relay control channel comprises relay control information and the shared data channel comprises relay data and user data, and wherein the first plurality of resource blocks lacks a shared data channel in the second time interval; and
transmit a second plurality of resource blocks in the transmission subframe, the second plurality of resource blocks frequency multiplexed with the first plurality of resource blocks and comprising a shared data channel in the second and third time intervals.

26. The base station of claim 25, wherein the first plurality of resource blocks and the second plurality of resource blocks jointly span the full transmission bandwidth, and wherein a power level of selected resource elements in the second time interval of the first plurality of resource blocks is controlled to equalize a power spectral density across OFDM symbols in the first time interval, the second time interval and the third time interval.

* * * * *